United States Patent
Millman

(10) Patent No.: US 8,910,179 B2
(45) Date of Patent: Dec. 9, 2014

(54) SYSTEMS AND METHODS FOR PROVIDING SEMAPHORE-BASED PROTECTION OF SYSTEM RESOURCES

(75) Inventor: Steven D. Millman, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 188 days.

(21) Appl. No.: 13/472,319

(22) Filed: May 15, 2012

(65) Prior Publication Data
US 2013/0312007 A1    Nov. 21, 2013

(51) Int. Cl.
*G06F 9/46*    (2006.01)

(52) U.S. Cl.
USPC .............................................. 718/106

(58) Field of Classification Search
CPC ....................................................... G06F 9/52
USPC ........................................................ 718/106
See application file for complete search history.

(56) References Cited

U.S. PATENT DOCUMENTS

| | | |
|---|---|---|
| 5,313,638 A | 5/1994 | Ogle et al. |
| 7,155,551 B2 | 12/2006 | Kolinummi et al. |
| 8,612,711 B1 * | 12/2013 | Griffin ......................... 711/165 |
| 2003/0081615 A1 * | 5/2003 | Kohn et al. ............... 370/395.42 |
| 2006/0004942 A1 * | 1/2006 | Hetherington et al. ........... 711/3 |
| 2011/0078670 A1 * | 3/2011 | Viry .............................. 717/149 |
| 2011/0153953 A1 * | 6/2011 | Khemani et al. ............... 711/136 |
| 2011/0167428 A1 * | 7/2011 | Sasidharan Nair et al. ... 718/106 |
| 2012/0151495 A1 * | 6/2012 | Burckhardt et al. .......... 718/106 |
| 2012/0180030 A1 * | 7/2012 | Crutchfield et al. .......... 717/149 |
| 2013/0055284 A1 * | 2/2013 | Sabato .......................... 718/106 |
| 2013/0198760 A1 * | 8/2013 | Cuadra et al. ................. 718/106 |

* cited by examiner

*Primary Examiner* — Emerson Puente
*Assistant Examiner* — Charlie Sun
(74) *Attorney, Agent, or Firm* — Sherry W. Schumm

(57) ABSTRACT

Embodiments include systems and methods that implement semaphore-based protection of various system resources. In an embodiment, a job scheduling module receives a job execution request from a requesting module (e.g., a CPU or other autonomous module). In response to receiving the job execution request, the job scheduling module identifies a descriptor, where the descriptor includes code configured to access a semaphore-protected resource. The job scheduling module causes a descriptor controller module to execute the descriptor. More specifically, execution of the descriptor includes the descriptor controller module performing a semaphore-based access of the protected resource. The job scheduling module also may coordinate sharing the descriptor among multiple descriptor controller modules (e.g., allowing parallel execution of portions of the descriptor). In various embodiments, using protection status flags or tokens that are accessed by the descriptor, semaphore-based protection of the resource is enforced even while the descriptor is being shared.

17 Claims, 6 Drawing Sheets

SYSTEMS AND METHODS FOR PROVIDING SEMAPHORE-BASED PROTECTION OF SYSTEM RESOURCES

TECHNICAL FIELD

Embodiments of the inventive subject matter relate to methods and apparatus for controlling access to shared resources.

BACKGROUND

In current multi-processor systems, semaphores are used to provide a mechanism for preventing concurrent accesses to shared resources (e.g., memory regions). When used properly, semaphores help to ensure that the processors access any particular shared resource serially, rather than concurrently, so that the shared resource may remain coherent.

In some systems, semaphores are implemented in software. More specifically, before a processor accesses (e.g., updates or writes to) a shared resource, the processor is required, by software convention, to determine whether a semaphore associated with the shared resource currently is locked by another processor. If not, the processor may lock the semaphore and access the shared resource, and other processors should avoid concurrent accesses to the shared resource. Only the processor that locked the semaphore may access the shared resource, and only that processor may unlock the semaphore after the access has been completed. Once the semaphore has been unlocked, another processor may attempt to lock the semaphore in order to reserve access to the shared resource.

In other systems, semaphores are implemented in hardware. For example, a system may include dedicated semaphore hardware (e.g., registers, logic circuitry, and so on) associated with various shared resources. When a processor locks a particular hardware semaphore, the hardware semaphore ensures that no other processor may perform a concurrent access to the resource protected by the semaphore. In other words, the semaphore is enforced by the hardware, rather than being enforced by each processor adhering to a particular software convention.

Software and hardware implemented semaphores each have various advantages and disadvantages. For example, although software semaphores may be implemented without extensively modifying the system architecture, implementation of software semaphores places a large computational burden on the processors. In addition, a risk is present that a processor may not properly follow the required semaphore usage protocol, which may lead to non-coherent accesses of shared resources. Proper system operation is guaranteed only when the processors use the semaphores in the correct manner. Failure to follow the required protocols, either because of a programming error or malicious software, may manifest itself in any of a number of error conditions (e.g., data corruption, system hangs, system crashes, and so on). Conversely, hardware semaphores do not typically consume extensive processor resources, and the risk of non-coherent accesses due to processor non-compliance is lower than for software-implemented semaphores. However, because each semaphore is implemented using specific hardware, the number of hardware semaphores implemented in a system may be limited based on the amount of system real estate that may be dedicated to semaphores, routing between the processors and the semaphore hardware, and other considerations. Accordingly, methods and apparatus for implementing semaphores are desired, which overcome at least some of the disadvantages of prior systems.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Figure 1:
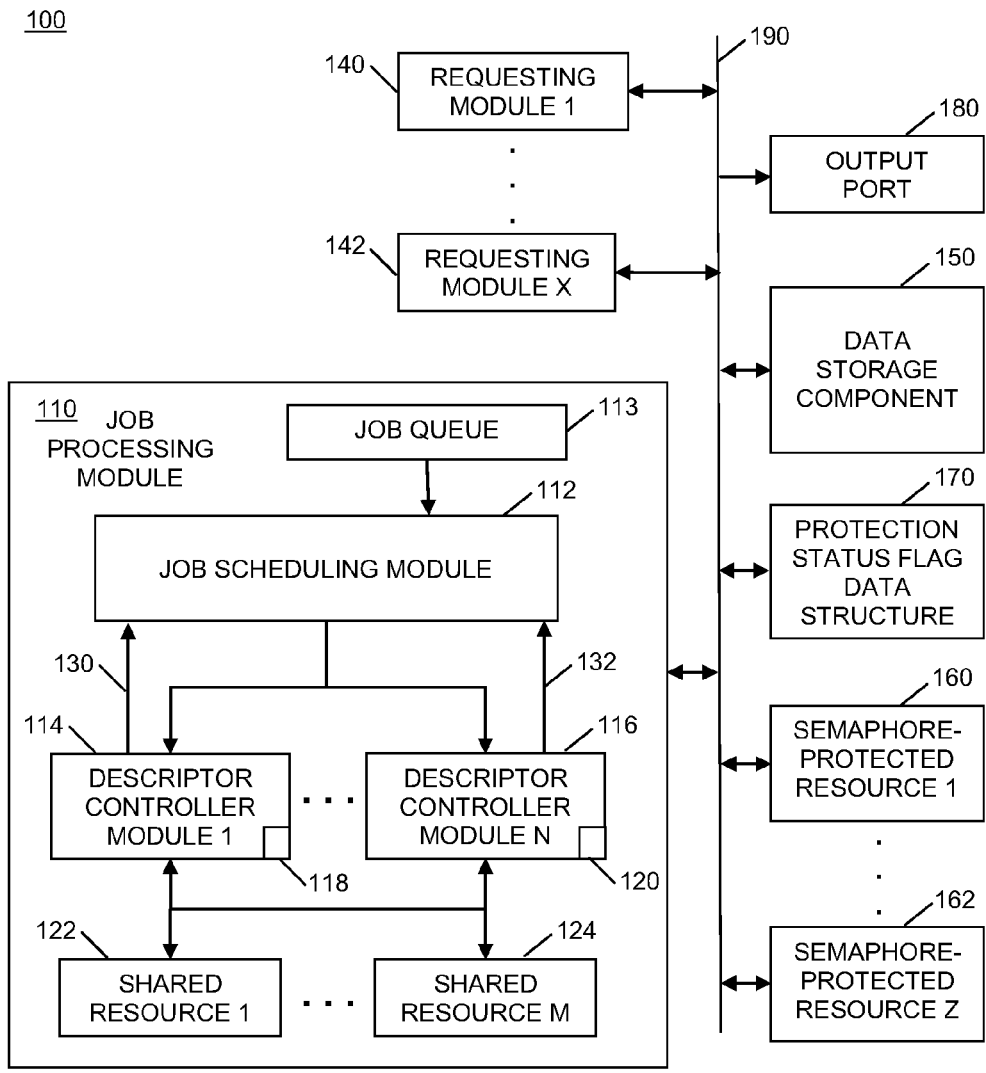
FIG. 1 is a simplified block diagram of an electronic system, in accordance with an example embodiment.

Embodiments of the inventive subject matter may be used in any of a variety of different types of systems in which there is a desire to implement semaphore-based protection of system resources. As used herein, a "semaphore" means a mechanism that ensures serial access to a particular resource that is accessible to multiple entities. More particularly, a semaphore is a mechanism that restricts access to a shared system resource to a single entity at a time. An example system in which semaphore-based protection of system resources is implemented is illustrated in FIG. 1 and described in detail below. Although a particular example system is provided to facilitate explanation of various embodiments, those of skill in the art would understand, based on the description herein, how to implement the various embodiments in other, differently-configured systems that may benefit from the advantages provided by the embodiments. Accordingly, implementation of the various embodiments in differently-configured systems is intended to be included within the scope of the inventive subject matter.

FIG. 1 is a simplified block diagram of an electronic system 100, in accordance with an example embodiment. System 100 includes job processing module 110, one or more job requesting modules 140, 142 (or "requesting modules"), one or more data storage components 150, and one or more semaphore-protected resources 160, 162, in an embodiment. More specifically, system 100 may include from 1 to X job requesting modules 140, 142, and from 1 to Z semaphore-protected resources 160, 162, where X and Z may be any integers (e.g., any integers from 1 to 10 or more). In further embodiments, system 100 may include a protection status flag data structure 170 and/or an output port 180. System 100 also may include a variety of additional and/or different system components (not illustrated), in various other embodiments.

As used herein, the term "module" means a distinct combination of hardware and/or software that is configured to perform one or more distinct functions. Various modules of system 100 may be implemented using completely distinct hardware and/or software, or multiple modules may use common hardware and/or software. According to an embodiment, requesting modules 140, 142 may include general-purpose or special-purpose processors (e.g., processor cores) or other types of circuitry capable of sharing semaphore-protected resources 160, 162. In a particular embodiment, one or more of the requesting modules 140, 142 may be configured to perform packet processing (e.g., implementation of a packet protocol).

Data storage component 150 may include, for example, random access memory (RAM), read only memory (ROM), flash memory, and so on. Although only a single data storage component 150 is illustrated in FIG. 1, it is to be understood that data storage component 150 may represent multiple data storage components of one or more types. In an embodiment, data storage component 150 is distinct from data storage associated with portions of job processing module 110 (e.g., descriptor storage structures 118, 120 associated with descriptor controller modules 114, 116, described later). Accordingly, data storage component 150 may be referred to as an "external data storage component," herein. In addition, although protection status flag data structure 170 and semaphore-protected resources 160, 162 are illustrated as being distinct from data storage component 150, some or all of these components may be incorporated within data storage component 150.

According to various embodiments, semaphore-protected resources 160, 162 may include data storage components (e.g., various types of RAM, ROM, flash memory, registers, and so on), portions of such components (e.g., storage locations associated with particular address ranges), input/output ports (e.g., parallel ports and/or serial ports), peripheral modules (e.g., cyclic-redundancy-check (CRC) calculation modules, checksum calculation modules, serial peripheral interfaces (SPIs), universal asynchronous receiver/transmitters (UARTs), counters, timers, memory controllers, display controllers (e.g., liquid crystal display (LCD) controllers), user interface controllers (e.g., keypad, touchscreen, and/or pointer controllers), interrupt controllers, power-on reset generators, and so on), and other shared entities for which semaphore-protection is desired. As indicated previously, data storage types of semaphore-protected resources 160, 162 may be distinct from or incorporated within data storage component 150.

According to an embodiment, protection status flag data structure 170 may include one or more registers or other data storage elements (e.g., RAM or flash memory elements), which are capable of storing indicators (e.g., flags) of the protection status of each semaphore-protected resource 160, 162. More specifically, a protection status flag (e.g., one or more bits) may be associated with each semaphore-protected resource 160, 162, and the state of the protection status flag indicates whether its corresponding semaphore-protected resource 160, 162 is or is not in a "protected state". As will be described in more detail later, when a semaphore-protected resource 160, 162 is in a protected state, access to the semaphore-protected resource 160, 162 is restricted. As indicated previously, protection status flag data structure 170 may be distinct from or incorporated within data storage component 150.

According to an embodiment, system 100 also includes one or more system buses 190 (or other communication-enabling mechanisms) over which the various components of system 100 may communicate with each other. System bus 190 may include, for example, one or more address and data buses over which addresses and data, respectively, may be communicated between system components. Although a single system bus 190 is illustrated in FIG. 1, it is to be understood that the communication mechanisms between various system components may be different from that illustrated in FIG. 1, including direct connections between components, connections through a hierarchy of buses, and connections through intervening circuitry and/or modules. In addition, system 100 may include various signaling conductors between components (e.g., for control purposes), power conductors, ground conductors, package pins, and so on.

As will be described in more detail below, job processing module 110 is configured to facilitate semaphore-protected accesses to semaphore-protected resources 160, 162. According to an embodiment, job processing module 110 includes a job scheduling module 112, one or more job queues 113, and one or more descriptor controller modules (DECOs) 114, 116. According to an embodiment, job processing module 110 may include from 1 to N DECOs 114, 116, where N may be any integer (e.g., any integer from 1 to 10 or more).

Job scheduling module 112 includes a special-purpose processor that is capable of receiving "job execution requests" (e.g., from the job queue 113, directly from bus 190, or from another interface or module), and scheduling "descriptors" specified by the job execution requests for execution on the DECOs 114, 116. As used herein, the term "job execution request" means a request provided by a requesting module 140, 142 to the job processing module 110 (e.g., communicated over system bus 190) for the job processing module 110 to perform one or more computer-implemented processes (e.g., resource access, signal processing, data processing, and so on). According to an embodiment, a job execution request may include information that facilitates identification of a descriptor configured to perform the job, when executed. For example, a job execution request may include a pointer to a descriptor that is stored in data storage component 150 or elsewhere. The location of the descriptor indicated in the job execution request is referred to herein as the "external descriptor location." In an alternate embodiment, the descriptor may be included in the job execution request.

As used herein, a "descriptor" means a unit of computer-executable code (e.g., a set of software instructions) which, when executed, performs one or more computer-implemented processes. A descriptor also may include one or more static parameters and/or variables. A descriptor may be persistently maintained in an external descriptor location (e.g., in data storage component 150 or elsewhere), for example, and may be downloaded for execution by the DECOs 114, 116. In various embodiments, a descriptor may be static or modifiable (e.g., a DECO 114, 116 may download a descriptor from the external descriptor location, alter the descriptor, and overwrite the previous version of the descriptor in the external descriptor location).

In a specific embodiment, job execution requests from requesting modules 140, 142 are placed in job queue 113. The job queue 113 includes a data storage structure configured to provide the functionality of an input queue for storage of job execution requests. For example, job queue 113 may be a first-in, first-out (FIFO) or ring buffer consisting of a plurality of addressable elements within which job execution requests may be stored. Although not specifically illustrated, system 100 also may include an output job queue.

Job scheduling module 112 is capable of retrieving each job execution request from the job queue 113 (e.g., in the order in which they were received), and providing a pointer to a descriptor identified in the job execution request to a DECO 114, 116 (or fetching all or part of the descriptor (e.g., from data storage component 150 or elsewhere) and providing the descriptor to the DECO 114, 116). According to an embodiment, the job scheduling module 114 also is capable of determining whether or not the descriptor can be "shared" from a DECO 114, 116 (as discussed later) and, when the descriptor can be shared, indicating the location of the shared descriptor to the DECO 114, 116 that will execute the descriptor.

Each DECO 114, 116 includes a special-purpose processor that is capable of executing descriptors at the direction of the job scheduling module 112. According to an embodiment, each DECO 114, 116 includes a descriptor storage structure 118, 120 associated therewith. Prior to its execution by a DECO 114, 116, a descriptor may be stored in a descriptor storage structure 118, 120 associated with the DECO 114, 116, and the DECO 114, 116 may access the descriptor from the descriptor storage structure 118, 120 during its execution of the descriptor. In an alternate embodiment, multiple DECOs 114, 116 may access a common descriptor storage structure (not shown).

When instructed by the job scheduling module 112 to execute a particular descriptor in order to fulfill a job specified by a job execution request, a DECO 114, 116 may copy the descriptor from data storage component 150 into a descriptor storage structure 118, 120 associated with the DECO 114, 116, and may execute the descriptor from the descriptor storage structure 118, 120. Alternatively, as will be described in more detail later, when a DECO 114, 116 has a particular descriptor already resident in its associated descriptor storage structure 118, 120 and a new job execution request that utilizes the descriptor is received by the job scheduling module 112, the descriptor may be "shared" (e.g., by the DECO 114, 116 in which the descriptor currently is resident). This may increase system efficiency by avoiding the necessity to download a descriptor from data storage component 150 when the descriptor already is resident within job processing module 110. As will also be described in more detail below, in an embodiment that includes multiple DECOs 114, 116, multiple instances of the same descriptor may be executed in parallel on multiple DECOs 114, 116 in order to increase system efficiency and/or throughput while maintaining semaphore-based protection of semaphore-protected resources 160, 162 that may be accessed by each instance of the descriptor.

In addition to the previously-described components, job processing module 110 may include one or more shared resources 122, 124, in an embodiment. According to an embodiment, job processing module 110 may include from 1 to M shared resources 122, 124, where M may be any integer (e.g., any integer from 1 to 10 or more).

A shared resource 122, 124 is a resource (e.g., a processing module or other resource) that a DECO 114, 116 may selectively reserve for its exclusive use. For example, a shared resource 122, 124 may be a processing module or other type of module to which a DECO 114, 116 may obtain a token. As long as the DECO 114, 116 has the token to a particular shared resource 122, 124, no other DECO 114, 116 may obtain the token. When a DECO 114, 116 that has a token subsequently releases it, another DECO 114, 116 may obtain the token. As will be described in more detail later, and in accordance with an embodiment, descriptors may use shared resources 122, 124 to implement semaphore-protected access of the semaphore-protected resources 160, 162. According to an embodiment, job processing module 110 includes fewer shared resources 122, 124 than DECOs 114, 116.

According to a particular embodiment, some descriptors include code which, when executed by a DECO 114, 116, performs one or more accesses to one or more semaphore-protected resources 160, 162. For example, an access to a semaphore-protected resource 160, 162 may include, but is not limited to, storing one or more values in a semaphore-protected resource 160, 162, reading one or more values from a semaphore-protected resource 160, 162, executing an instruction stored in a semaphore-protected resource 160, 162, providing data, control signals, or instructions to a semaphore-protected resource 160, 162, and/or otherwise accessing a semaphore-protected resource 160, 162.

To facilitate explanation of the various embodiments, a particular example embodiment is discussed herein. In the example, system 100 is configured to output blocks of data serially through output port 180 (e.g., in the context of packet-based communications, where each block of data may represent a set of bits to be serially transmitted in conjunction with a packet). For example, system 100 may store blocks of data in data storage component 150, and may convert each block of data to a serial bitstream by outputting the data via output port 180 (e.g., a serial port). To perform this process, each data block may be transferred from data storage component 150 into an output buffer, where the output buffer is considered to be a semaphore-protected resource 160, 162. Once transferred into the output buffer, the data block may then be transferred to the output port 180 for serial output.

To reduce the risk that a system component may transfer a data block into the output buffer and either that system component or another system component subsequently corrupts the data block before the data block is consumed (e.g., before it is transferred from the buffer to the output port 180), a semaphore-based protection scheme is implemented using one or more types of descriptors, in an embodiment. More particularly, to initiate transfer of a data block from data storage component 150 to the output buffer, a requesting module 140, 142 provides a job execution request to the job processing module 110 (e.g., via the job queue 113 via system bus 190), where the job execution request identifies a descriptor which, when executed, will cause the job processing module 110 to transfer the data block from data storage component 150 into the output buffer (i.e., into the semaphore-protected resource 160, 162) only when the output buffer currently is not protected by a semaphore. More specifically, when the job processing module 110 receives the job execution request, the job scheduling module 112 identifies a descriptor that is capable of performing the data transfer using a semaphore-based scheme that protects data in the output buffer from corruption prior to consumption. The job scheduling module 112 may then cause a DECO 114, 116 to execute the identified descriptor, as will be explained in more detail later. Although the above example is discussed in detail herein, it is to be understood that the semaphore protection mechanisms associated with the various embodiments may be used to perform a wide variety of other processes in which semaphore-protected access to a shared system resource is desired. Accordingly, the example described herein should not be interpreted to limit the scope of the inventive subject matter.

In some cases, the job scheduling module 112 may receive multiple job execution requests that correspond to a same descriptor (e.g., the multiple job execution requests point to the same descriptor address in data storage component 150 or elsewhere). In general, job execution requests that specify the same descriptor are scheduled by the job scheduling module 112 in the order in which they are received (e.g., into the job queue 113). According to an embodiment, when multiple job execution requests specify the same descriptor, the job scheduling module 112 may evaluate whether the descriptor may be "shared" (e.g., accessed from the descriptor storage structure 118, 120 of a DECO 114, 116, rather than being downloaded from the external descriptor location). As used herein, a descriptor is "sharable" when the descriptor is of a descriptor type that allows for sharing, and a "sharable" descriptor may be "shared" under certain conditions. For example, in response to receiving a first job execution request, the job scheduling module 112 may schedule the corresponding descriptor to be executed by a first DECO 114, 116. The DECO 114, 116 may download the descriptor from the external descriptor location into its associated descriptor storage structure 118, 120, and may begin executing the descriptor. At this point, the DECO 114, 116 may be considered to be a "possessing DECO" (i.e., a DECO 114, 116 that has a descriptor that potentially may be shared). When the descriptor is of a sharable type, the DECO 114, 116 also may notify the job execution module 112 that the DECO 114, 116 can share the descriptor. In addition, as will be discussed in more detail below, the DECO 114, 116 may indicate the type of sharing permitted. The job execution module 112 may thereafter receive a second job execution request that specifies the same descriptor, and based at least on the sharing-related information from the DECO 114, 116, the job scheduling module 112 may evaluate whether the descriptor can be shared. The job scheduling module 112 may then schedule the second execution instance of the descriptor accordingly.

Said another way, when a new job execution request is received, the job scheduling module 112 may allow the corresponding descriptor to be shared when: a) the corresponding descriptor already is loaded in a descriptor storage structure 118, 120 associated with a first DECO 114, 116; b) the descriptor is of a sharable type; and c) the job scheduling module 112 has determined that the first DECO 114, 116 can share the descriptor (e.g., based on an indication from the first DECO 114, 116). Depending on the type of sharing allowed by the descriptor (e.g., as indicated by the DECO 114, 116 to the job scheduling module 112), the descriptor may be shared back into the same DECO 114, 116 (i.e., the first DECO 114, 116) or may be shared with a second, different DECO 114, 116. When the descriptor is shared back to the first DECO 114, 116, the job scheduling module 112 may instruct the first DECO 114, 116 to access the previously-downloaded version of the descriptor in its associated descriptor storage structure 118, 120, rather than re-fetching the descriptor from the external descriptor location. When the descriptor is to be shared with a second DECO 114, 116, the job scheduling module 112 may instruct the second DECO 114, 116 to copy the descriptor from the descriptor storage structure 118, 120 associated with the first DECO 114, 116 into the descriptor storage structure 118, 120 associated with the second DECO 116, 118. When the job scheduling module 112 does not indicate that a descriptor has been shared, the DECO 114, 116 that will execute the descriptor is forced to download the descriptor into its descriptor storage structure 118, 120 from the external descriptor location. In an alternate embodiment, and as indicated previously, the job scheduling module 112 alternatively may provide all or part of a descriptor to a DECO 114, 116, rather than requiring the DECO 114, 116 to obtain the descriptor itself.

According to an embodiment, and as indicated above, the descriptor may only be shared while the descriptor is currently being executed by a DECO 114, 116. Unless the job scheduling module 112 receives an indication from the DECO 114, 116 that the descriptor can be shared while the DECO 114, 116 is executing the descriptor, the job scheduling module 112 will not enable the descriptor to be shared. According to another embodiment, the descriptor may be shared as long as it is still resident within the descriptor storage structure 118, 120 of a DECO 114, 116 that has indicated that the descriptor can be shared.

As indicated above, the determination of whether or not a descriptor may be shared depends, at least in part, on the type of descriptor, in an embodiment. For example, the system may support at least four types of descriptors with various restrictions on sharing. The four types of descriptors include: 1) a "never share" descriptor type; 2) an "always share" descriptor type; 3) a "wait share" descriptor type; and 4) a "serial share" descriptor type. A "never share" descriptor is a type of descriptor that may not be shared. In other words, each time that the job execution module 112 schedules the descriptor for execution by a DECO 114, 116, the DECO 114, 116 must download the descriptor from the external descriptor location, regardless of whether the descriptor already is loaded in the descriptor storage structure 118, 120 for that DECO 114, 116 or another DECO 114, 116. In contrast, an "always share" descriptor is a type of descriptor that always may be shared when the descriptor is loaded into the descriptor storage structure 118, 120 of any DECO 114, 116 and, in an embodiment, the DECO 114, 116 is currently executing the descriptor. The use of an always share descriptor in processing a flow may increase performance by enabling parallel execution of the descriptor on multiple DECOs 114, 116. As will be explained in more detail in conjunction with FIG. 6, later, an always share descriptor may use a shared resource 122, 124 to implement semaphore-protected access of a semaphore-protected resource 160, 162.

A "wait share" descriptor is a type of descriptor that may be shared only when a DECO 114, 116 that is currently executing the descriptor indicates to the job scheduling module 112 (e.g., via control signal 130, 132) that the descriptor can be shared. After receiving a second job execution request that specifies the same descriptor, and absent such an indication, the job scheduling module 112 will schedule the descriptor for execution without sharing (i.e., forcing the DECO 114, 116 to which the second job is scheduled to fetch the descriptor from the external descriptor location). The use of a wait share descriptor in processing a flow also may increase performance by enabling parallel execution of portions of the descriptor on multiple DECOs 114, 116. As will be explained in more detail in conjunction with FIG. 4, later, a wait share descriptor may access a protection status flag (e.g., stored in protection status flag data structure 170) in conjunction with implementation of semaphore-protected access of a semaphore-protected resource 160, 162. Alternatively, as will be explained in more detail in conjunction with FIG. 6, later, a wait share descriptor may use a shared resource 122, 124 to implement semaphore-protected access of a semaphore-protected resource 160, 162.

Finally, a "serial share" descriptor is a type of descriptor that may be shared only into a DECO 114, 116 that already has the descriptor loaded into its associated descriptor storage structure 118, 120. More specifically, for sequential jobs that specify a serial share descriptor, the job scheduling module 112 will schedule the descriptor into a particular DECO 114, 116 when the DECO 114, 116 is currently executing (or previously executed, in another embodiment) the descriptor, and the DECO 114, 116 has indicated that the descriptor is a serial share type of descriptor and that the descriptor can be shared. Implementation of the serial share descriptor enables the system to cause all job execution requests for a particular data flow that are concurrently resident in job processing module 110 to be executed by the same DECO 114, 116.

Figure 2:
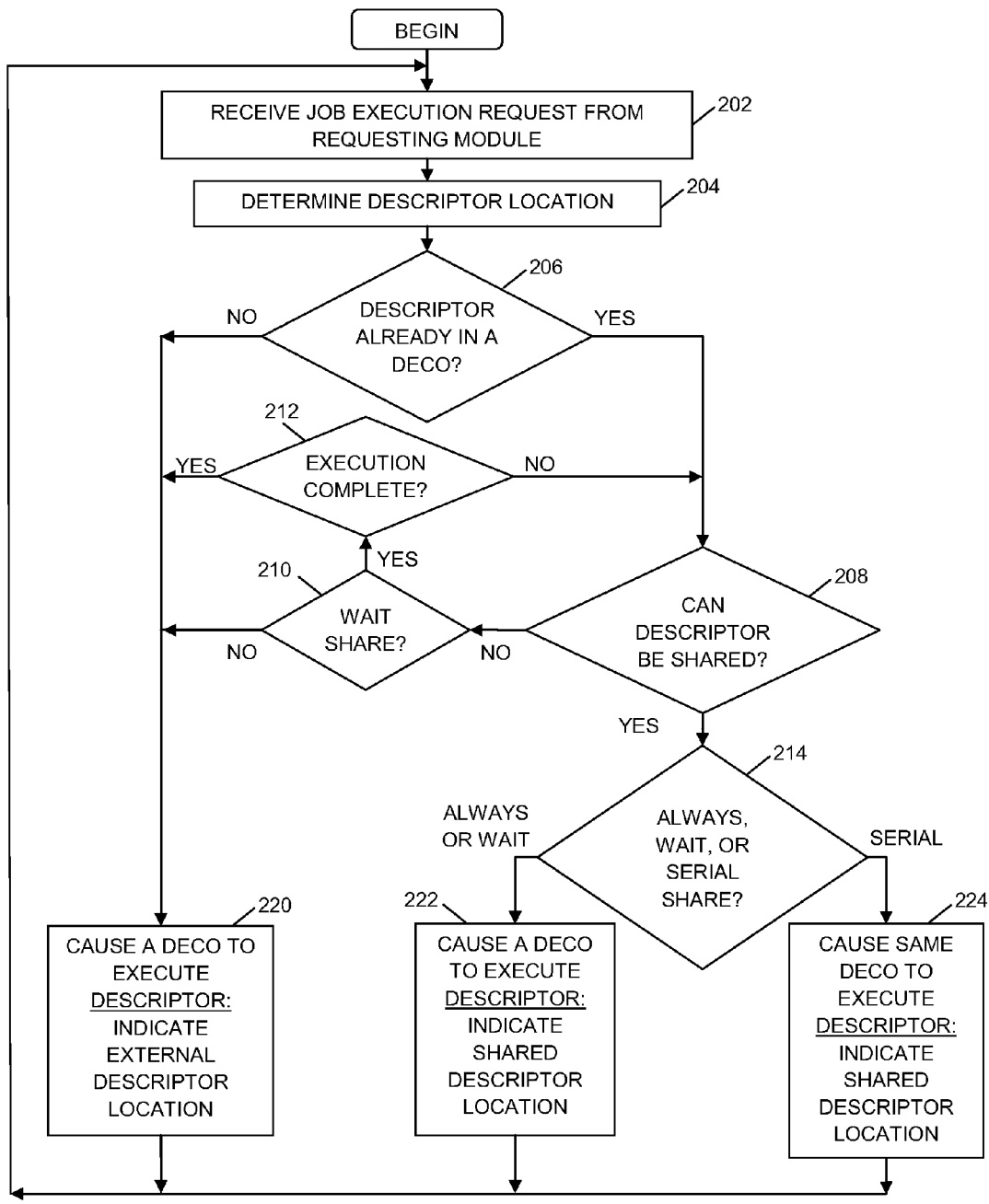
FIG. 2 is a flowchart of a method for a job scheduling module to coordinate sharing and execution of a descriptor in response to a job execution request from a requesting module, in accordance with an example embodiment.

FIG. 2 is a flowchart of a method for a job scheduling module (e.g., job scheduling module 112, FIG. 1) to coordinate execution and sharing of a descriptor by a DECO (e.g., one of DECOs 114, 116, FIG. 1) in response to a job execution request from a requesting module (e.g., one of requesting modules 140, 142, FIG. 1), in accordance with an example embodiment. The method may begin, in block 202, when the job scheduling module receives a job execution request from a requesting module (e.g., via job queue 113, FIG. 1). From the job execution request, the job scheduling module may determine, in block 204, an external descriptor location of a descriptor that may be used to satisfy the job (e.g., in data storage component 150, FIG. 1, or elsewhere). For example, the job execution request may include a pointer to the external descriptor location.

In block 206, the job scheduling module may determine whether the descriptor already is stored in the descriptor storage structure of any DECO (e.g., one of descriptor storage structures 118, 120, FIG. 1) and/or whether the descriptor currently is being executed by any DECO. For example, the job scheduling module may keep track of the most recent descriptors it has assigned for execution on each DECO. When the identified descriptor is the same as a currently executing or most recently executed descriptor on a particular DECO, the job scheduling module may infer that the identified descriptor currently is stored in the descriptor storage structure for that DECO. Accordingly, the descriptor theoretically may be shared from that descriptor storage structure.

When the job scheduling module determines that the descriptor is not already stored in the descriptor storage structure of a DECO, the job scheduling module may cause a DECO to execute the descriptor, in block 220, without indicating that the descriptor has been shared. For example, the job sharing module may cause a DECO to execute the descriptor by sending a control signal or command to the DECO, which indicates the external descriptor location. As will be described in more detail in conjunction with FIG. 3, the DECO may then fetch the descriptor from the external descriptor location, and store the descriptor in the DECO's associated descriptor storage structure (e.g., descriptor storage structure 118, 120, FIG. 1) for subsequent execution. In an alternate embodiment, rather than requiring the DECO to fetch the descriptor, the job scheduling module may fetch the descriptor itself (e.g., from the external descriptor location) and provide the descriptor to the DECO for storage in its associated descriptor storage structure. In another alternate embodiment, the job scheduling module may create the descriptor and provide the descriptor to the DECO for storage in its associated descriptor storage structure.

Conversely, when the job scheduling module determines that the descriptor is already stored in the descriptor storage structure of a DECO, the job scheduling module may determine whether or not the corresponding DECO has indicated that the descriptor can be shared, in block 208. According to an embodiment, a DECO may indicate to the job scheduling module that the descriptor can be shared and, in an embodiment, the type of sharing that is permitted based on the descriptor type. Depending on the descriptor construction, the DECO may provide this indication at the start of descriptor execution or after descriptor execution has proceeded for a while, as will be described in more detail later. Either way, the job scheduling module may determine that the previously-stored descriptor can be shared when the job scheduling module has received an indication from the DECO that is executing (or executed) the descriptor that the DECO can share the descriptor.

When the job scheduling module has not received an indication from a DECO that the identified descriptor can be shared, the job scheduling module may further determine whether the identified descriptor is a wait share type of descriptor, in block 210. In an embodiment, for a wait share type of descriptor, the job scheduling module may wait until the execution of the descriptor has completed to see if the possessing DECO will indicate that the descriptor can be shared. Accordingly, when the descriptor is a wait share type of descriptor, a further determination may be made, in block 212, whether descriptor execution has completed. If not, the method iterates as shown. If the identified descriptor is not a wait share type of descriptor (as determined in block 210) or the descriptor execution has completed (as determined in block 212), the job scheduling module may cause a DECO (e.g., one of DECOs 114, 116, FIG. 1) to execute the descriptor, in block 220 (as described above), without indicating that the descriptor has been shared. For example, the job scheduling module may send a pointer to the external descriptor location to the DECO that the job scheduling module has scheduled to execute the descriptor.

Referring back to block 208, when the job scheduling module has determined that the descriptor can be shared, the job scheduling module may then coordinate sharing of the descriptor based on the descriptor or sharing type. For example, the job scheduling module may share the descriptor differently based on whether the descriptor is an always share descriptor, a wait share descriptor, or a serial share descriptor (e.g., as indicated by decision block 214). When the descriptor is an always share or a wait share descriptor, the job scheduling module may cause a DECO to execute the descriptor, in block 222, and may provide an indication that the descriptor has been shared. Further, the job scheduling module may indicate from where the descriptor should be accessed (e.g., the descriptor storage structure of the possessing DECO, within which the descriptor currently is located). In some cases, the job scheduling module may cause the same DECO to execute the descriptor, in which case the DECO may access the descriptor from its associated descriptor storage structure without the need to fetch the descriptor from another location. In other cases, the job scheduling module may cause a different DECO to execute the descriptor, in which case the DECO may copy the descriptor from another DECO's associated descriptor storage structure into its own associated descriptor storage structure. Either way, when the DECO has access to the descriptor in its associated descriptor storage structure, the DECO may execute the descriptor.

Referring again to block 214, when the descriptor is a serial share descriptor, the job scheduling module may cause the same DECO that previously executed the descriptor to execute the descriptor again, in block 224, and may provide an indication that the descriptor has been shared. In such a case, the DECO may access the descriptor from its associated descriptor storage structure without the need to fetch the descriptor from another location.

Once the descriptor associated with job execution request has been scheduled for execution by the job scheduling module (e.g., in block 220, 222 or 224), the method may iterate as shown in FIG. 2 (i.e., the job scheduling module may receive a next job execution request and may handle the request as described above). In some embodiments, some of the previously described types of descriptors may not be implemented in the system. In such embodiments, those portions of the process depicted in FIG. 4 pertaining to the non-implemented descriptor types may be excluded.

Figure 3:
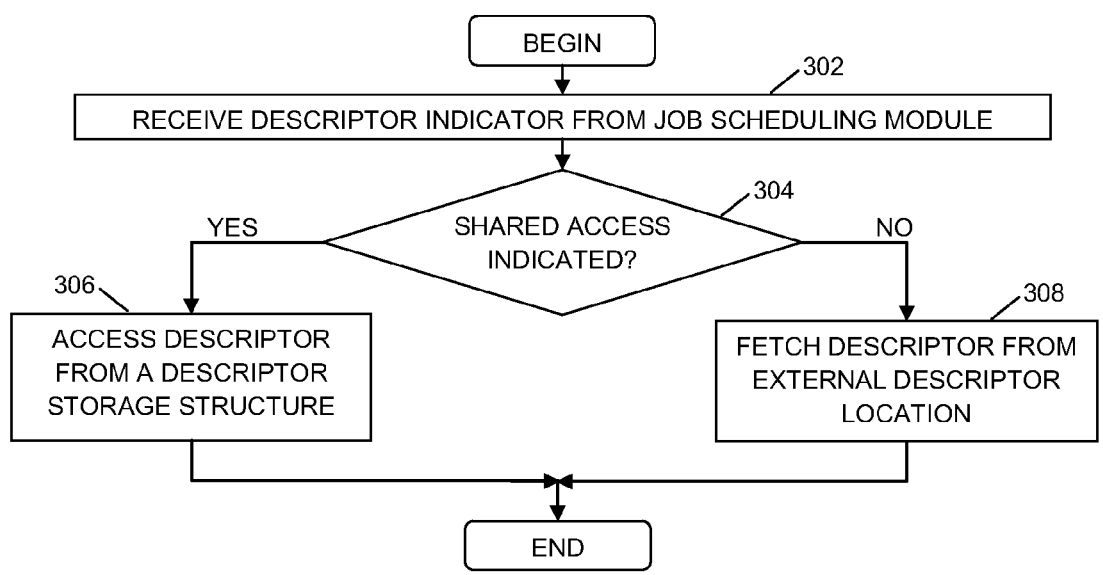
FIG. 3 is a flowchart of a method for a descriptor controller module to access a descriptor, in accordance with an example embodiment.

FIG. 3 is a flowchart of a method for a DECO (e.g., one of DECOs 114, 116, FIG. 1) to access a descriptor in response to the descriptor being scheduled by a job scheduling module (e.g., job scheduling module 112, FIG. 1) for execution on the DECO, in accordance with an example embodiment. The method may begin, in block 302, when the DECO receives a control signal or command from the job scheduling module, which indicates that the DECO should execute a descriptor. According to an embodiment, the job scheduling module also may indicate whether the descriptor has been shared by indicating a location from which the DECO may access the descriptor. For example, the job scheduling module may indicate that the descriptor has not been shared when the job scheduling module indicates that the DECO should access the descriptor from an external descriptor location (e.g., data storage component 150, FIG. 1 or elsewhere). Conversely, the job scheduling module may indicate that the descriptor has been shared when the job scheduling module indicates that the DECO should access the descriptor from a descriptor storage structure (e.g., one of descriptor storage structures 118, 120, FIG. 1).

When the DECO determines that the job scheduling module has indicated that the DECO should access the descriptor from a descriptor storage structure (e.g., the descriptor has been shared), the DECO proceeds to access the descriptor from the indicated descriptor storage structure, in block 306 (e.g., from the descriptor storage structure of the possessing DECO). More particularly, when the indicated descriptor storage structure is the DECO's own associated descriptor storage structure, the DECO already has access to the descriptor. However, when the indicated descriptor storage structure is associated with another DECO, the DECO copies the descriptor from the descriptor storage structure of the other DECO into its own associated descriptor storage structure, in an embodiment. In an alternate embodiment, the job scheduling module may provide the descriptor to the DECO, or may copy the descriptor into the DECO's descriptor storage structure.

Referring again to block 304, when the DECO determines that the job scheduling module has not indicated that the descriptor has been shared (or that the descriptor should be fetched from an external descriptor location), the DECO fetches the descriptor from the external descriptor location (e.g., from data storage component 150, FIG. 1 or elsewhere) in block 308, and copies the descriptor into its associated descriptor storage structure. In an alternate embodiment, the job scheduling module may provide the descriptor to the DECO, or may copy the descriptor into the DECO's descriptor storage structure. The method may then end or, more specifically, the DECO may then proceed to execute the descriptor.

Figure 4:
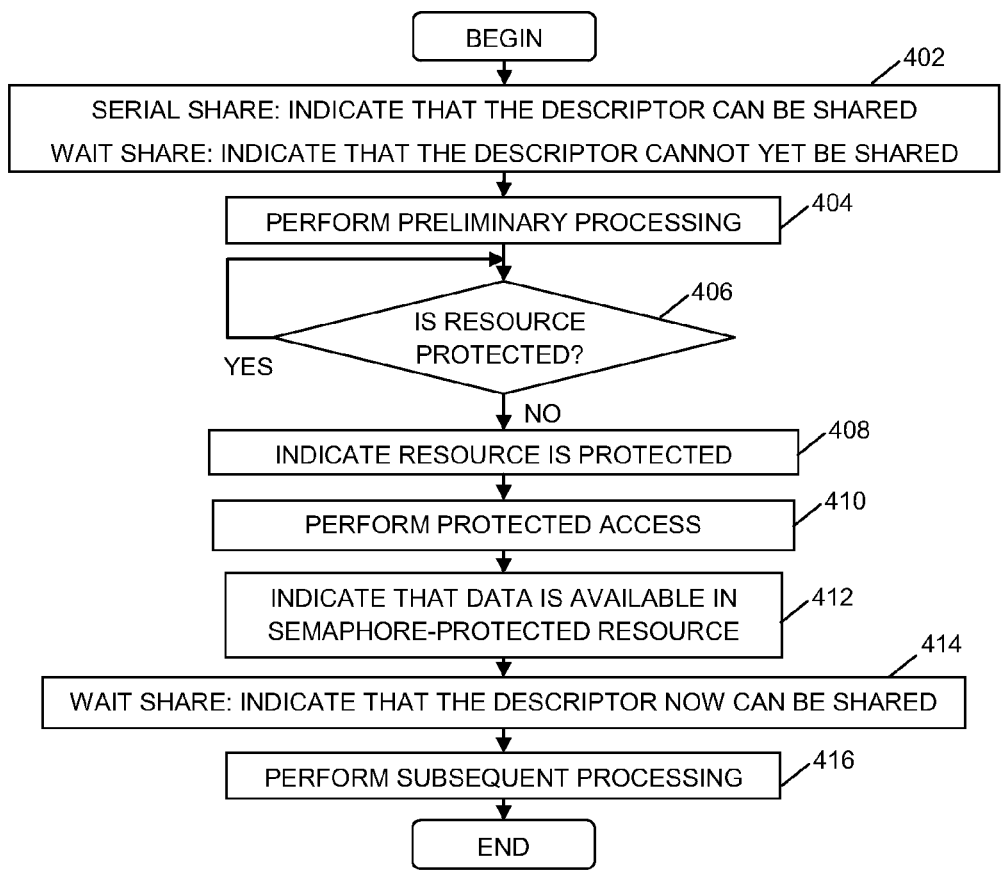
FIG. 4 is a flowchart of a method for a descriptor controller module to perform semaphore-based access of a protected system resource, in accordance with an example embodiment.
Figure 5:
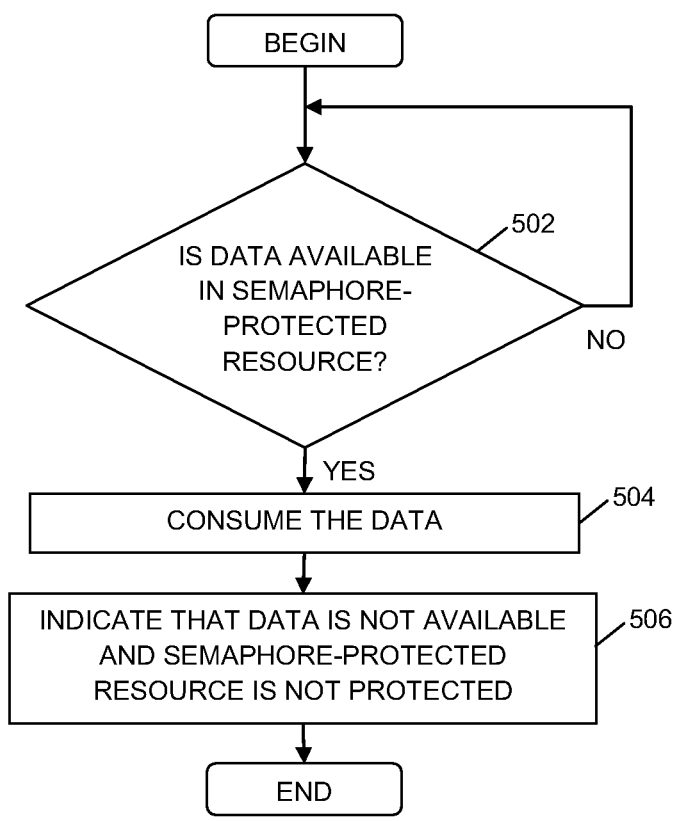
FIG. 5 is a flowchart of a method for a system module to perform an additional access of a protected system resource, in accordance with an example embodiment.
Figure 6:
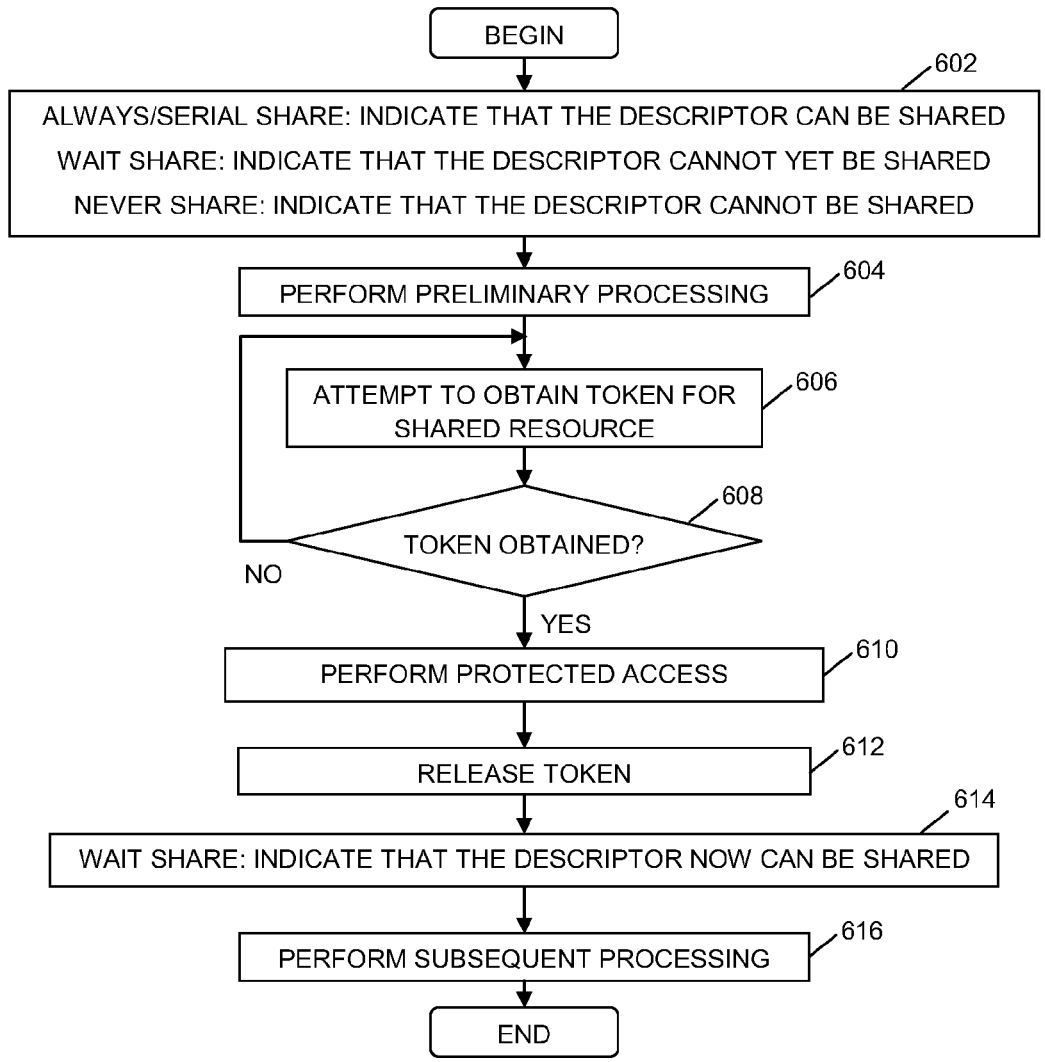
FIG. 6 is a flowchart of a method for a descriptor controller module to perform semaphore-based access of a protected system resource, in accordance with another example embodiment.

FIGS. 4-6 represent embodiments of methods of providing semaphore-based access of semaphore-protected resources (e.g., semaphore-protected resources 160, 162, FIG. 1), where the various methods may be codified in various types of descriptors, and carried out through execution of the descriptors by a DECO. More specifically, the method depicted in FIG. 4 corresponds to an embodiment of a descriptor which, when executed by a DECO, accesses a protection status indicator (e.g., a protection status flag stored in protection status flag data structure 170, FIG. 1 or elsewhere) to implement the semaphore-based protection of a semaphore-protected resource. The embodiment of the method depicted in FIG. 5 corresponds to a companion process of FIG. 4, although the method depicted in FIG. 5 may or may not be codified in a descriptor and/or executed by a DECO. Instead, as will be explained further below, the embodiment of the method depicted in FIG. 5 may be performed by a module that is distinct from a DECO (e.g., by a requesting module 140, 142, FIG. 1, or some other module).

FIG. 4 is a flowchart of a method for a DECO (e.g., one of DECOs 114, 116, FIG. 1) to perform semaphore-based access of a protected system resource (e.g., one of semaphore-protected resources 160, 162, FIG. 1), in accordance with an example embodiment. As mentioned above, the method may be codified in a descriptor, and the method may be performed when the descriptor is loaded into a descriptor storage structure associated with the DECO and subsequently executed by the DECO. The method of FIG. 4 may be performed in the context of a serial share or wait share descriptor, in various embodiments.

According to an embodiment, the method may begin, in block 402, when the DECO indicates to the job scheduling module (e.g., via control signal 130, 132, FIG. 1) whether or not the descriptor can be shared based on the descriptor type. For example, in an embodiment, if the descriptor is a serial share descriptor, the DECO may indicate to the job scheduling module that the descriptor can be shared. Conversely, if the descriptor is a wait share descriptor, the DECO may indicate that the descriptor cannot yet be shared (or may refrain from indicating that the descriptor can be shared).

In block 404, prior to performing the semaphore-based access of the semaphore-protected system resource (which occurs in block 408), various preliminary processes may be performed. The preliminary processing may include any of a variety of processes, the nature of which is not particularly important. However, the preliminary processing block 404 is included to indicate that a descriptor may include processes that occur before a semaphore-based access of the semaphore-protected system resource.

Blocks 406, 408, and 410 relate directly to the semaphore-based access of the protected resource. More specifically, in block 406, a determination is made whether the semaphore-protected system resource currently is in a protected state, in which access to the semaphore-protected resource is disallowed. For example, referring to the previously-presented example, the semaphore-protected resource may include a data buffer into which blocks of data may be transferred (e.g., from data storage component 150, FIG. 1) for subsequent output via an output port (e.g., output port 180, FIG. 1). According to an embodiment, the data buffer may be maintained in a protected state whenever a data block has been written into the data buffer but not yet fully consumed (e.g., output to the output port). Once the data block has been fully consumed, the data buffer may be placed in an unprotected state (e.g., in block 506, FIG. 5, described later).

According to an embodiment, the determination of whether or not the semaphore-protected resource (e.g., the data buffer) is in a protected state may be made by evaluating a protection status flag associated with the semaphore-protected resource (e.g., a protection status flag stored in protection status flag data structure 170, FIG. 1). The semaphore-protected resource may be considered to be in a protected state when the protection status flag has a first value, and the semaphore-protected resource may be considered to be in an un-protected (and thus accessible) state when the protection status flag has a second value. As long as the semaphore-protected resource is in the protected state, the DECO will not access the semaphore-protected resource.

When a determination is made that the semaphore-protected resource is not in the protected state, the DECO may change the protection status to indicate that the semaphore-protected resource now is in a protected state, in block 410. For example, the DECO may change the protection status flag associated with the semaphore-protected resource to indicate that the semaphore-protected resource is in the protected state. According to an embodiment, only the descriptor may change the protection status to indicate that the semaphore-protected resource now is in a protected state (e.g., by setting the protection status flag), and only the consumer of the data within the semaphore-protected resource may change the protection status to indicate that the semaphore-protected resource now is not in a protected state (e.g., by clearing the protection status flag as discussed in conjunction with FIG. 5, below). This reduces the risk that another module may attempt to access the semaphore-protected resource while the DECO is accessing the resource.

In block 410, the DECO may access the semaphore-protected resource. For example, in the above-described example, the DECO may transfer a block of data from a data storage component (e.g., data storage component 150, FIG. 1) into the semaphore-protected resource (e.g., into the data buffer). In other embodiments, other types of accesses may be performed (e.g., reads from a semaphore-protected resource, execution of instructions stored in a semaphore-protected resource, and so on).

In the above-described example, once the data block has been transferred into the semaphore-protected resource, the DECO also may indicate that data is available for consumption in the semaphore-protected resource, in block 412. More specifically, once the DECO has completed the transfer of the data block from the data storage component (e.g., data storage component 150, FIG. 1) into the data buffer, the DECO may indicate that the data is ready to be output to the output port (e.g., output port 180, FIG. 1) by altering the value of a data status flag associated with the semaphore-protected resource or by providing a signal to a module that will consume the data (e.g., an interrupt to a requesting module 140, 142, FIG. 1). As will be described in conjunction with FIG. 5, another descriptor may be executed in a DECO (or code may be executed in another module) to transfer the data block from the data buffer to the output port, and once the transfer is completed, to indicate that the data buffer is again in an unprotected state.

In block 414, which corresponds to an embodiment in which the descriptor is a wait share type of descriptor, the DECO may then indicate to the job scheduling module (e.g., via control signal 130, 132, FIG. 1) that the descriptor that the DECO is executing now can be shared. This enables the job scheduling module to coordinate sharing of the descriptor with another DECO. In an alternate embodiment, block 414 may be performed earlier or later than depicted in FIG. 4.

In block 416, after performing the semaphore-based access of the semaphore-protected system resource, various subsequent processing may be performed. As with the preliminary processing described in conjunction with block 404, the subsequent processing may include any of a variety of processes, the nature of which is not particularly important. However, the subsequent processing block 416 is included to indicate that a descriptor may include processes that occur after a semaphore-based access of the semaphore-protected system resource. When the descriptor is a wait share descriptor, the descriptor may be executed by multiple DECOs in parallel, and the system efficiency and throughput may be increased. Upon completion of the subsequent processing (if performed), the method may end (e.g., the DECO may complete its execution of the descriptor that codifies the method of FIG. 4).

FIG. 5 is a flowchart of a method for a system module (e.g., a DECO 114, 116, a requesting module 140, 142, FIG. 1, or another module) to perform an additional access of a protected system resource (e.g., one of semaphore-protected resources 160, 162, FIG. 1), in accordance with an example embodiment. The embodiment of the method of FIG. 5 is specific to the example discussed above, in which data transferred into a data buffer using the method of FIG. 4 is subsequently consumed, and the protection status of the data buffer is changed to an unprotected state. The method of FIG. 5 may be codified in a descriptor that is executed by a DECO, in an embodiment. Alternatively, the method of FIG. 5 may be performed by a different module (e.g., a requesting module 140, 142, FIG. 1, or another module).

Either way, the method may begin, in block 502, by determining whether data is available for consumption in a semaphore-protected resource (e.g., in a data buffer). For example, this determination may be made by evaluating a data status flag associated with the semaphore-protected resource or by receiving a signal (e.g., an interrupt) from a DECO that placed the data in the semaphore-protected resource.

Once the data is available in the semaphore-protected resource, the data may be consumed, in block 504. For example, in the previously-provided example, the data may be transferred from the output buffer to an output port (e.g., output port 180, FIG. 1). When the last of the data has been consumed, indications may be made, in block 506, that the data is no longer available (e.g., by altering the data status flag), and that the semaphore-protected resource is no longer protected (e.g., by altering the protection status flag associated with the semaphore-protected resource). For example, this may allow a DECO to transfer a new block of data in the data buffer for subsequent output via the output port. The method may then end.

As explained above, the embodiments of the methods depicted in FIGS. 4 and 5 implement semaphore-based protection of a semaphore-protected resource by accessing a protection status indicator (e.g., a protection status flag stored in protection status flag data structure 170, FIG. 1 or elsewhere). Alternatively, according to an embodiment of a method depicted in FIG. 6, semaphore-based protection of a semaphore-protected resource may be implemented by obtaining exclusive use of a resource (e.g., one of shared resources 122, 124, FIG. 1) that is shared by multiple DECOs. For example, exclusive use of a shared resource may be obtained when a DECO obtains a token associated with the resource, and the exclusive use of the resource may be relinquished when the DECO releases the token, in an embodiment. While the DECO has exclusive use of the resource (e.g., while the DECO has the token), the DECO may make a protected access to a semaphore-protected resource. Otherwise, the DECO may not access the semaphore-protected resource.

FIG. 6 is a flowchart of a method for a DECO (e.g., one of DECOs 114, 116, FIG. 1) to perform semaphore-based access of a protected system resource (e.g., one of semaphore-protected resources 160, 162, FIG. 1), in accordance with another example embodiment. As mentioned above, the method may be codified in a descriptor, and the method may be performed when the descriptor is loaded into a descriptor storage structure associated with the DECO and subsequently executed by the DECO. The method of FIG. 6 may be performed in the context of a never share, always share, serial share or wait share descriptor, in various embodiments.

According to an embodiment, the method may begin, in block 602, when the DECO indicates to the job scheduling module (e.g., via control signal 130, 132, FIG. 1) whether or not the descriptor can be shared, based on the descriptor type. For example, in an embodiment, if the descriptor is either an always share or a serial share descriptor, the DECO may indicate to the job scheduling module that the descriptor can be shared. Conversely, if the descriptor is a wait share descriptor, the DECO may refrain from indicating that the descriptor can be shared (or may make a positive indication that the descriptor cannot yet be shared). If the descriptor is a never share descriptor, the DECO also may refrain from indicating that the descriptor can be shared (or may make a positive indication that the descriptor cannot be shared).

In block 604, various preliminary processes may be performed prior to performing the semaphore-based access of the semaphore-protected resource (which occurs in block 610). Similar to the preliminary processing discussed in conjunction with FIG. 4 (block 404), the preliminary processing may include any of a variety of processes, the nature of which is not particularly important.

Blocks 606, 608, and 610 relate directly to the semaphore-based access of the protected resource. According to an embodiment, a resource that is shared between multiple DECOs (e.g., one of shared resources 122, 124, FIG. 1) may be associated through a descriptor with a particular semaphore-protected resource (e.g., one of semaphore-protected resources 160, 162, FIG. 1). More specifically, for a shared resource that may be reserved by only one DECO at a time (e.g., by a DECO obtaining a token to the resource), the shared resource may be used to implement a semaphore to serialize access to the particular semaphore-protected resource. For example, when a DECO has reserved a shared resource associated with a particular semaphore-protected resource (e.g., by obtaining the shared resource's token), the DECO may access the semaphore-protected resource. Conversely, any DECOs that have not reserved the shared resource (e.g., any DECOs that do not possess the token) may not access the semaphore-protected resource.

Referring to block 606, the DECO may attempt to obtain a token to exclusively reserve a shared resource (e.g., one of shared resources 122, 124, FIG. 1). If another DECO already has the token, indicating that the semaphore-protected resource is in a protected state, the DECO's attempt to obtain the token will be unsuccessful. However, if no other DECO already has the token, indicating that the semaphore-protected resource is in an unprotected state, the DECO may be successful at obtaining the token. By attempting to obtain the token to the shared resource, the DECO essentially is determining whether or not the semaphore-protected resource is in a protected or unprotected state.

According to an embodiment, once the DECO has obtained the token (as indicated by block 608), the DECO may then perform a protected access to the semaphore-protected resource, in block 610. For example, in the above-described example, the DECO may transfer a block of data from a data storage component (e.g., data storage component 150, FIG. 1) into the semaphore-protected resource (e.g., into the data buffer). In other embodiments, other types of accesses may be performed (e.g., reads from a semaphore-protected resource, execution of instructions stored in a semaphore-protected resource, and so on).

In block 612, the DECO may then release the token, thus placing the semaphore-protected resource in an unprotected state, and allowing the token to be obtained by another DECO (or subsequently by the same DECO). In block 614, which corresponds to an embodiment in which the descriptor is a wait share type of descriptor, the DECO may then indicate to the job scheduling module (e.g., via control signal 130, 132, FIG. 1) that the descriptor that the DECO is executing now can be shared. This enables the job scheduling module to coordinate sharing of the descriptor with another DECO. In an alternate embodiment, block 614 may be performed earlier or later than depicted in FIG. 6.

In block 616, after performing the semaphore-based access of the semaphore-protected system resource, various subsequent processing may be performed. As with the subsequent processing described in conjunction with block 416 (FIG. 4), the subsequent processing may include any of a variety of processes, the nature of which is not particularly important. Upon completion of the subsequent processing (if performed), the method may end (e.g., the DECO may complete its execution of the descriptor that codifies the method of FIG. 6).

According to an embodiment, a descriptor stored in a particular external descriptor location (e.g., in data storage component 150, FIG. 1, or elsewhere) may be used for a particular job flow (i.e., a group of sequentially-received jobs that access a first semaphore-protected resource). Similarly, descriptors stored in other external descriptor locations may be used for other job flows (i.e., other groups of jobs that access the first semaphore-protected resource or other semaphore-protected resources). Accordingly, the starting address of a descriptor in an external descriptor location can be used to distinguish one job flow from another, although the descriptors may be distinguished using other properties, as well. In an embodiment, the system is capable of storing a large number of descriptors in different external descriptor locations, each of which may be used to protect the same or different semaphore-protected resources. Accordingly, an embodiment of the system is capable of protecting a large number of semaphore-protected resources.

In addition, in an embodiment in which semaphore-protection of a resource is implemented using tokens to shared resources (e.g., an embodiment of the method of FIG. 6 that may utilize tokens to shared resources 122, 124, FIG. 1), a token for any particular shared resource may be used by different descriptors corresponding to different flows. Those different descriptors may or may not execute simultaneously on multiple DECOs (e.g., DECOs 114, 116). When a first descriptor corresponding to a first flow has the token to a particular shared resource, and a second descriptor corresponding to a second flow attempts to obtain the token for that shared resource, the second descriptor will be temporarily stalled until the first descriptor releases the token. Accordingly, although a system may include a finite number of shared resources and corresponding tokens, each token may be used by many distinct flows. In an embodiment, different descriptors (i.e., those with different addresses) can only protect the same protected resource as long as they are using the same token.

Thus, various embodiments of systems and methods for providing semaphore-based protection of system resources have been described. An embodiment of a method includes a job scheduling module receiving a job execution request from a requesting module, where the job execution request includes information facilitating identification of a descriptor that includes computer-executable code which, when executed, performs an access to a semaphore-protected resource. In response to receiving the job execution request, the job scheduling module causes a first descriptor controller module to execute the descriptor and to perform the access to the semaphore-protected resource. The descriptor includes computer-executable code which, when executed, makes a determination of whether the semaphore-protected resource is in a protected state, and the first descriptor controller module accesses the semaphore-protected resources when the determination is made that the semaphore-protected resource is not in a protected state.

Another embodiment of a method includes a first descriptor controller module receiving an indication that the first descriptor controller module should execute a descriptor that includes computer-executable code which, when executed, performs an access to a semaphore-protected resource, where the indication was provided in response to receiving a job execution request from a requesting module. In response to receiving the indication, the first descriptor controller module accesses and executes the descriptor, including performing the access to the semaphore-protected resource.

An embodiment of a system includes a job scheduling module and a first descriptor controller module. The job scheduling module is capable of receiving a job execution request from a requesting module, where the job execution request includes information facilitating identification of a descriptor that includes computer-executable code which, when executed, performs an access to a semaphore-protected resource. In response to receiving the job execution request, the job scheduling module provides an indication to a first descriptor controller module to execute the descriptor. The first descriptor controller module is capable of receiving the indication that the first descriptor controller module should execute the descriptor, and in response to receiving the indication, accessing and executing the descriptor, including performing the access to the semaphore-protected resource.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description and associated figures indicate that various elements, modules or features are "connected" or "coupled" together in particular ways. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method performed in a system that includes a first descriptor controller module and a second descriptor controller module, the method comprising:
    a job scheduling module receiving first and second job execution requests from one or more requesting modules, wherein the first and second job execution requests each include information facilitating identification of a descriptor that includes computer-executable code which, when executed, performs an access to a semaphore-protected resource;
    in response to receiving the first job execution request, the job scheduling module causing the first descriptor controller module to load the descriptor into a first descriptor storage structure, and to execute the descriptor and to perform the access to the semaphore-protected resource, wherein
    the descriptor includes the computer-executable code which, when executed, makes a determination of whether the semaphore-protected resource is in a protected state, and accesses the semaphore-protected resource when the determination is made that the semaphore-protected resource is not in a protected state;
    in response to receiving the second job execution request, the job scheduling module determining whether the descriptor can be shared; and
    when the job scheduling module determines that the descriptor can be shared, the job scheduling module deciding whether to cause the first or the second descriptor controller module to execute the descriptor in response to receiving the second job execution request, wherein
        when the job scheduling module decides to cause the first descriptor controller module to execute the descriptor, the job scheduling module provides an indication to the first descriptor controller module that the descriptor should be accessed from the first descriptor storage structure, and
        when the job scheduling module decides to cause the second descriptor controller module to execute the descriptor, the job scheduling module provides the indication to the second descriptor controller module that the descriptor should be accessed from the first descriptor storage structure.

2. The method of claim 1, wherein:
    when the job scheduling module determines that the first descriptor cannot be shared, and when the job scheduling module decides to cause the first descriptor controller module to execute the descriptor in response to the second job request, the job scheduling module provides an indication to the first descriptor controller module that the descriptor should be accessed from an external descriptor location; and
    when the job scheduling module determines that the descriptor cannot be shared, and when the job scheduling module decides to cause the second descriptor controller module to execute the descriptor in response to the second job request, the job scheduling module provides an indication to the second descriptor controller module that the descriptor should be accessed from the external descriptor location.

3. The method of claim 1, wherein:
    when the job scheduling module determines that the descriptor cannot be shared and the descriptor is a wait share descriptor, the job scheduling module makes a further determination whether the first descriptor controller module has completed execution of the descriptor;

when the job scheduling module determines that the first descriptor controller module has completed execution of the descriptor, the job scheduling module provides an indication to the first descriptor controller module that the descriptor should be accessed from an external descriptor location; and when the job scheduling module determines that the first descriptor controller module has not completed execution of the descriptor, the job scheduling module repeats the steps of determining whether the descriptor can be shared, and if not, determining whether execution of the descriptor has completed.

4. The method of claim 1, wherein:

when the job scheduling module determines that the descriptor can be shared and the descriptor is a serial share descriptor, the job scheduling module provides an indication to the first descriptor controller module that the descriptor should be accessed from the first descriptor storage structure.

5. The method of claim 1, wherein:

the semaphore-protected resource includes a buffer; and
the descriptor includes the computer-executable code which, when executed, makes a determination of whether the buffer is in a protected state, and transfers data from a memory into the buffer when the determination is made that the buffer is not in a protected state.

6. The method of claim 5, further comprising:

determining whether the data is available in the buffer;
when the data is available in the buffer, transferring the data from the buffer to an output port; and
providing an indication that the buffer is not in the protected state.

7. A method comprising:

a first descriptor controller module receiving an indication, in response to a first job execution request, that the first descriptor controller module should execute a descriptor that includes computer-executable code which, when executed, performs an access to a semaphore-protected resource;

in response to receiving the indication, the first descriptor controller module loading the descriptor into a first descriptor storage structure, and executing the descriptor, including performing the access to the semaphore-protected resource, wherein the descriptor includes the computer-executable code which, when executed, makes a determination of whether the semaphore-protected resource is in a protected state, and accesses the semaphore-protected resource when the determination is made that the semaphore-protected resource is not in a protected state; and a second descriptor controller module receiving, in response to a second job execution request, an indication that the second descriptor controller module should execute the descriptor, and receiving an indication that the second descriptor controller module should access the descriptor from the first descriptor storage structure.

8. The method of claim 7, wherein executing the descriptor comprises:

making the determination whether the semaphore-protected resource is in a protected state;
accessing the semaphore-protected resource when the determination is made that the semaphore-protected resource is not in a protected state; and providing an indication that the semaphore-protected resource is in the protected state.

9. The method of claim 8, wherein:

making the determination whether the semaphore-protected resource is in a protected state includes evaluating a protection status flag, which indicates whether or not the semaphore-protected resource is in the protected state; and providing the indication that the semaphore-protected resource is in the protected state includes modifying the protection status flag to indicate that the semaphore-protected resource is in the protected state.

10. The method of claim 8, wherein:

making the determination whether the semaphore-protected resource is in a protected state includes attempting to obtain a token associated with a shared resource, wherein the semaphore-protected resource is in the protected state when the token cannot be obtained, and the semaphore-protected resource is not in the protected state when the token can be obtained.

11. The method of claim 7, further comprising:

the first descriptor controller module refraining from providing an indication that the descriptor can be shared while performing the access to the semaphore-protected resource; and the first descriptor controller module providing an indication that the descriptor can be shared after performing the access to the semaphore-protected resource.

12. The method of claim 7, wherein:

the semaphore-protected resource includes a buffer; and
executing the descriptor includes making a determination of whether the buffer is in a protected state, and transferring data from a memory into the buffer when the determination is made that the buffer is not in the protected state.

13. A method performed in a system that includes multiple descriptor controller modules, the method comprising:

a first descriptor controller module receiving a first indication that the first descriptor controller module should execute a descriptor that includes computer-executable code which, when executed, performs an access to a semaphore-protected resource, wherein the first indication was provided in response to receiving a job execution request;

the first descriptor controller module receiving a second indication whether the descriptor should be accessed from an external descriptor location or from a descriptor storage structure associated with one of the multiple descriptor controller modules;

when the second indication is that the descriptor should be accessed from the descriptor storage structure, the first descriptor controller module further determining whether the descriptor storage structure is a first descriptor storage structure associated with the first descriptor controller module or a different descriptor storage structure associated with a different descriptor controller module;

when the descriptor storage structure is the different descriptor storage structure, the first descriptor controller module copying the descriptor from the different descriptor storage structure into the first descriptor storage structure; and the first descriptor controller module executing the descriptor, including performing the access to the semaphore-protected resource, wherein the descriptor includes the computer-executable code which, when executed, makes a determination of whether the semaphore-protected resource is in a protected state, and accesses the semaphore-protected resource when the determination is made that the semaphore-protected resource is not in a protected state.

14. A system comprising:

a processor executing instructions to perform a method, the method comprising:
- a first descriptor controller module;
- a second descriptor controller module; and
- a job scheduling module that
    - receives first and second job execution requests from one or more requesting modules, wherein the first and second job execution requests each include information facilitating identification of a descriptor that includes computer-executable code which, when executed, performs an access to a semaphore-protected resource,
    - in response to receiving the first job execution request, provides a first indication to the first descriptor controller module to load the descriptor into a first descriptor storage structure, and to execute the descriptor, and
    - in response to receiving the second job execution request, the job scheduling module determines whether the descriptor can be shared, wherein when the job scheduling module determines that the descriptor can be shared, the job scheduling module decides whether to cause the first or the second descriptor controller module to execute the descriptor in response to receiving the second job execution request, wherein
        - when the job scheduling module decides to cause the first descriptor controller module to execute the descriptor, the job scheduling module provides a second indication to the first descriptor controller module that the descriptor should be accessed from the first descriptor storage structure, and
        - when the job scheduling module decides to cause the second descriptor controller module to execute the descriptor, the job scheduling module provides the second indication to the second descriptor controller module that the descriptor should be accessed from the first descriptor storage structure
    - wherein, in response to receiving the first indication, the first descriptor controller module accesses and executes the descriptor, including performing the access to the semaphore-protected resource, wherein the descriptor includes the computer-executable code which, when executed, makes a determination of whether the semaphore-protected resource is in a protected state, and accesses the semaphore-protected resource when the determination is made that the semaphore-protected resource is not in a protected state.

15. The system of claim 14, wherein:
- when the descriptor cannot be shared, the job scheduling module provides a third indication that the descriptor has not been shared;
- when the job scheduling module decides to cause the first descriptor controller module to execute the descriptor, the first descriptor controller module accesses the descriptor from an external descriptor location in response to the third indication; and
- when the job scheduling module decides to cause the second descriptor controller module to execute the descriptor, the second descriptor controller module accesses the descriptor from the external descriptor location in response to the third indication.

16. The system of claim 14, further comprising:
- one or more shared resources,
- wherein the first descriptor controller module is capable of determining whether the semaphore-protected resource is in a protected state by attempting to obtain a token associated with a shared resource of the one or more shared resources, wherein the semaphore-protected resource is in the protected state when the token cannot be obtained, and the semaphore-protected resource is not in the protected state when the token can be obtained.

17. The system of claim 14, wherein the semaphore-protected resource includes a buffer, and wherein the system further comprises:
- a memory, wherein the access to the semaphore-protected resource includes transferring data from the memory to the buffer, and the first descriptor controller module is capable of making a determination of whether the buffer is in a protected state, and transferring the data from the memory into the buffer when the determination is made that the buffer is not in a protected state, and
- wherein a requesting module is capable of determining whether the data is available in the buffer, and when the data is available in the buffer, transferring the data from the buffer to an output port, and providing an indication that the buffer is not in the protected state.

* * * * *